Jan. 24, 1967     J. S. CHANDLER ETAL     3,299,789
AUTOMATIC EXPOSURE CONTROL SYSTEM
Filed June 5, 1964
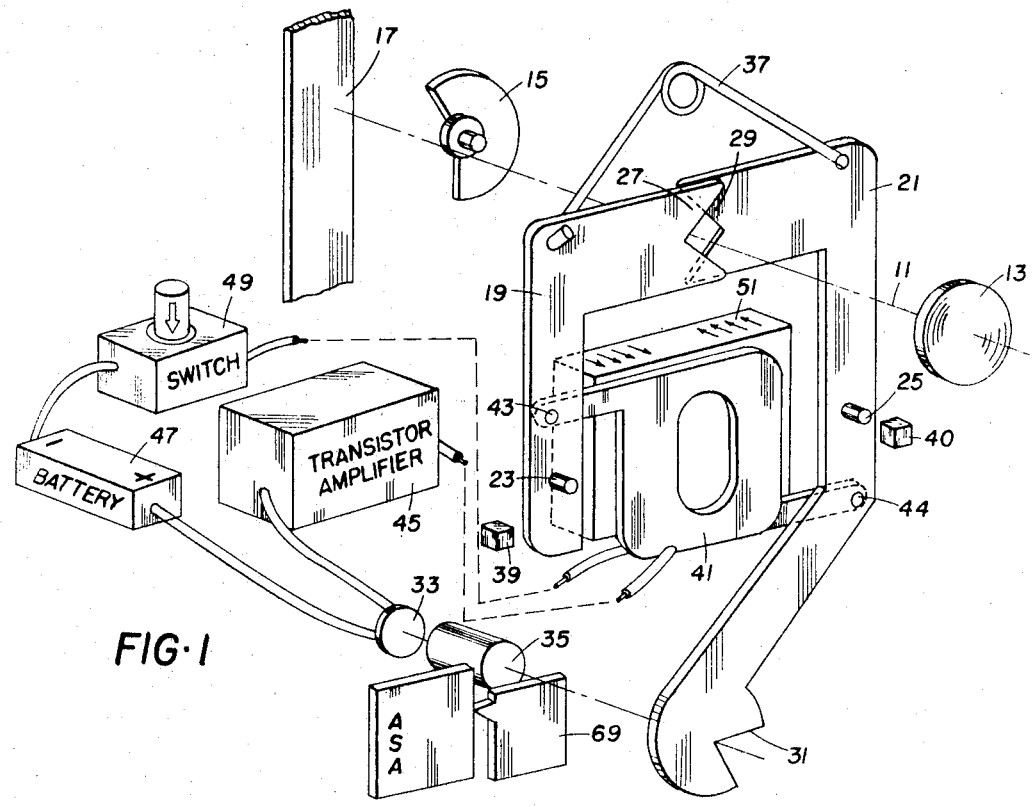
FIG·1
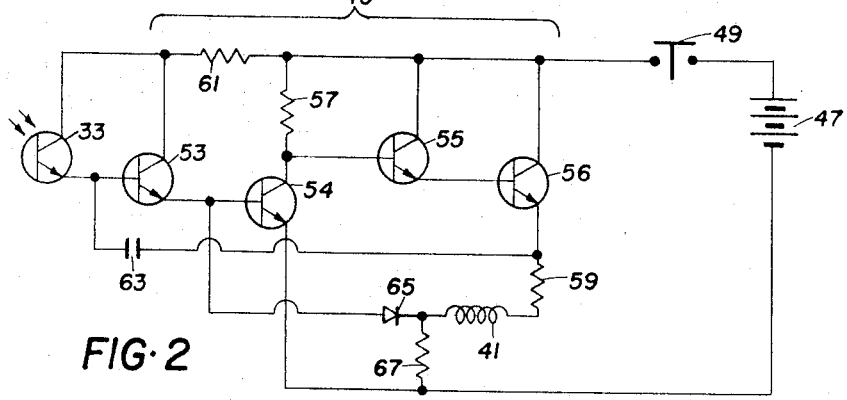
FIG·2
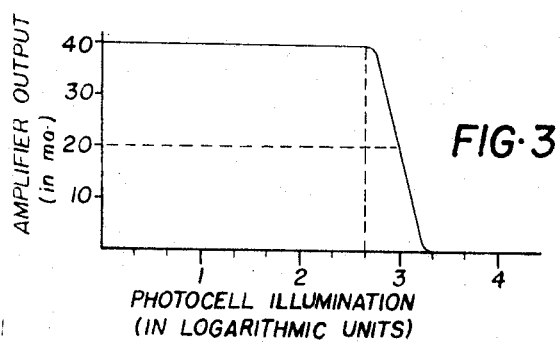
FIG·3
JASPER S. CHANDLER
HARVEY O. HOADLEY
INVENTORS
BY R. Frank Smith
Morton A. Polster
ATTORNEYS

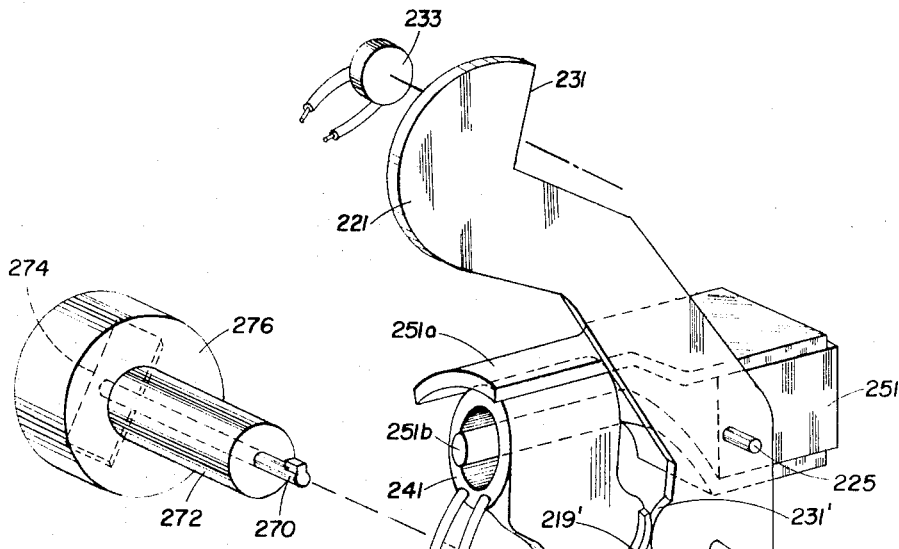
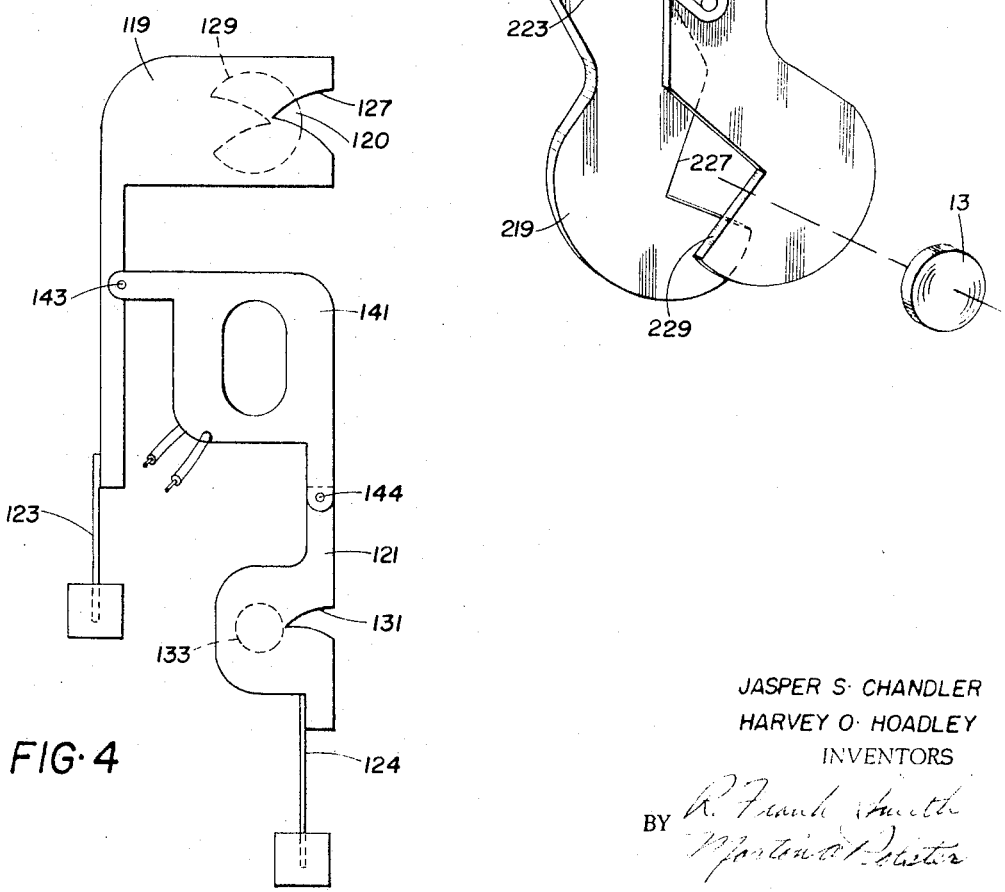

United States Patent Office

3,299,789
Patented Jan. 24, 1967

3,299,789
AUTOMATIC EXPOSURE CONTROL SYSTEM
Jasper S. Chandler, Rochester, and Harvey O. Hoadley, Penfield, N.Y., assignors to Eastman Kodak Company, Rochester, N.Y., a corporation of New Jersey
Filed June 5, 1964, Ser. No. 373,022
8 Claims. (Cl. 95—64)

This invention relates to cameras and more particularly to photographic cameras having automatic exposure control systems.

In many of the well known automatic exposure control devices for cinematographic cameras, a photocell illuminated by the scene being photographed energizes a galvanometer which in turn positions a variable mask to alter the camera aperture as a function of the intensity of scene light. Many such devices utilize what is referred to as "null" systems in which a secondary masking means also positioned by the galvanometer controls the illumination of the photocell as a function of the position of the variable aperture masking the picture-taking lens. The masks are moved simultaneously, varying the exposure of both the photocell and the picture-taking lens until the output of the photocell energizes the galvanometer with a motive force equal to the force biasing the galvanometer toward its rest position. One of the problems plaguing this type of exposure control system is the necessary frailty of the delicate moving parts which must be driven by the galvanometer. Attempts have been made at producing sturdier null systems by utilizing electronic amplification means in conjunction with a solenoid, the variable masks for the picture-taking lens and for the photocell being driven by the solenoid armature as a function of the energization of the photocell. However, such solenoid mechanisms have been less than satisfactory due to the difficulty in obtaining linear movement of the solenoid armature, such non-linearity apparently resulting from unstable hysteresis effects in the armature caused by variations in the magnetism induced in the armature as it is moved in and out of the solenoid.

The invention herein is an improvement on the solenoid-type exposure control system. In the system disclosed herein a pair of variable aperture vanes are pivotally mounted to mask both the camera's picture-taking lens and the photocell. A relatively heavy coil is supported solely by the vanes and is energized by an amplifier output which varies in accordance with the response of the photocell. A relatively large permanent magnet is placed in proximity to the coil so that its magnetic field interacts with that of the energized coil, and causes the coil to move relative to the magnet when the coil is energized. In the preferred form of the invention, the variable aperture vanes are normally biased to a closed position, and when operation of the camera is initiated, the amplifier supplies maximum energization to the coil, inducing the coil to move relative to the fixed magnet and thereby opening the vanes and exposing the film and the photocell simultaneously. The increasing exposure of the photocell increases its output and causes a reduction in the output of the amplifier, the system rapidly coming to rest when the energization of the coil induces in it a motive force equal to the bias tending to close the vanes.

Another problem confronting exposure control systems which attempt to replace fragile galvanometer-driven devices with sturdier moving elements has been random non-linear operation arising from stray electrical effects intrinsic to the electronic amplifying systems which are necessary to provide adequate driving force for the heavier, less delicate mechanisms. The subject invention minimizes operational variations resulting from friction and from stray electrical effects by designing the amplifier so that its output ranges from virtually zero to maximum within a change of photocell illumination equivalent to approximately two-thirds of a stop, that is, substantially the full range of amplifier output is elicited in response to a relatively minor variation in scene brightness in which the intensity of photocell illumination increases or decreases by one-third of a stop from a preselected value. In this way all stray electrical effects can do no more than alter film exposure by the equivalent of one-third of an f-stop, an exposure variation which, in terms of photographic results, is well within the latitude for "acceptable" pictures.

In one embodiment of the invention herein the movable coil is wound in a very flat form and moves perpendicular to its axis, permitting maximum efficiency within a minimum spacial requirement. In another embodiment disclosed herein the usual pivot-point bearings for the movable vanes are replaced by spring mountings to minimize wear and increase the durability of the system.

It is an object of this invention to provide a sturdier, more rugged, less expensive exposure control mechanism for cinematographic cameras.

It is another object of this invention to provide an automatic exposure control system which utilizes a vane mechanism which supports and is positioned by a relatively heavy coil, the coil being moved relative to a permanent magnet as a function of the intensity of scene illumination.

It is a further object of this invention to provide an electronic amplifying system for energizing the moving members of an automatic exposure control system for cinematographic cameras in which stray electrical effects are minimized.

Still another object is to provide an automatic exposure control system in which the usual bearing points for movable parts are replaced by spring mountings to improve durability.

A still further object is to provide an exposure control system for cinematographic cameras in which the variable aperture is closed in its normal rest position so that each operation of the camera results in underexposure of the initial and closing frames of each sequence rather than in the usual over-exposure of these frames.

Other objects, purposes and characteristic features of the present invention will be in part obvious from the accompanying drawings, and in part pointed out as the description of the invention progresses. In describing the invention in detail, reference will be made to the accompanying drawings, in which like reference characters designate corresponding parts throughout the several views and similar reference characters (e.g., 15, 115, 215) designate similar parts in the various embodiments disclosed, and in which:

FIG. 1 is an exploded perspective schematic diagram of the preferred embodiment of the invention herein with portions of the camera omitted to facilitate understanding;

FIG. 2 is a schematic of the transistor amplifier and other elements of the electronic circuit utilized in the invention herein;

FIG. 3 is a graphic representation of the output characteristics of the amplifier illustrated in FIG. 2;

FIG. 4 is a second embodiment of the invention herein shown in plan view with only enough parts included to permit understanding of the novel features of this particular embodiment; and FIG. 5 is an exploded perspective drawing of a third embodiment of the invention herein including only sufficient parts to permit a full understanding of the particular features of this embodiment.

Referring now to FIG. 1, the preferred form of the exposure control mechanism disclosed herein is shown in exploded perspective schematic form, the various essential parts of the mechanism being illustrated in their relative positions as they would appear in a camera adapted according to the invention herein. On the camera's picturetaking axis 11 are mounted lens 13 and shutter 15 in alignment with the film 17 which is to be exposed. A pair of vane elements 19 and 21 are mounted for movement about pivots 23 and 25, respectively, and have formed end portions 27 and 29, respectively, which cooperate to form the variable aperture for the camera. A large notch 31 formed in the opposite end of vane element 21 provides a variable mask for photocell 33 which is positioned behind light integrating cylinder 35. A spring 37 normally biases vane elements 19 and 21 to a closed position against stops 39 and 40. It should be noted that vane elements 19 and 21 are illustrated in an energized, partially open position.

A coil 41, which is flatly wound so that its axial dimension is substantially less than its inside diameter, is mounted between vanes 19 and 21, being completely supported by pivot pins 43 and 44. Coil 41 is connected to photocell 33 by means of a circuit including amplifier 45, power source 47 and switch 49. A large permanent magnet 51 is fixedly mounted in proximity to coil 41, the magnetic field of magnet 51 being aligned as indicated by the small arrows. This alignment of the field of permanent magnet 51, in conjunction with the direction of energization of coil 41, induces a motive force tending to move coil 41 to the left as viewed in the drawings, such movement acting on vanes 19 and 21 to move them about their respective pivots against the bias of spring 37 to increase the exposure of film 17 and photocell 33.

In the preferred form of the invention, photocell 33 is a photoresponsive transistor which is connected to an amplifier such as that illustrated in FIG. 2, which consists basically of two Darlington stages composed of NPN transistors 53, 54, and 55, 56, respectively. Photoresponsive transistor 33 is connected to the base of the first Darlington stage which has a low resistance 57 in its output circuit at the collector of transistor 54. The base of the second Darlington stage is connected to the collector of transistor 54, while coil 41 is placed in series with the emitter of transistor 56. Resistor 59 is selected to match the impedance of the output of the second Darlington stage with coil 41. Resistor 61 is added to the circuit for the purpose of suppressing noise from the motor drive of the camera which is also operated from power source 47, while capacitor 63, diode 65, and resistor 67, are added to the amplifier to increase stability of the entire exposure control mechanism by minimizing possible oscillations of the vane mechanism when operation is initiated or when sudden light changes are experienced.

The operation of the amplifier is designed so that its output in response to the illumination of phototransistor 33 is as shown graphically in FIG. 3. With no illumination reaching the photocell the output current through coil 41 is at its maximum, and the output current remains near this maximum value until such time as the illumination of the photocell closely approaches a predetermined intensity, at which time the first Darlington stage begins to conduct quite heavily, causing a large voltage drop to occur over resistor 57 and thereby cutting down the output of the second Darlington stage. The characteristics of the amplifier are such that when the illumination on the photocell increases slightly above the preselected intensity level, the output of the amplifier drops to substantially zero. It can thus be seen that the output of the amplifier increases to its maximum whenever the illumination of the photocell decreases in an amount equivalent to approximately one-third an exposure value unit (APEX—Additive Photographic Exposure System), and conversely, the output of the amplifier drops to substantially zero when the illumination on the photocell increases to a point approximately one-third of an exposure value unit greater than the predetermined level of intensity.

A secondary masking means 69 indicated in FIG. 1 is positioned in front of photocell 33 to vary the exposure of the photocell as a function of appropriate exposure-determining variables, such as, film sensitivity, shutter speed, and/or the introduction of filters in front of camera lens 13. Masking means 69 is set manually by the camera operator in accordance with predetermined calibrations depending upon the exposure-determining variable for which compensation is required.

In their normal rest position, vanes 19 and 21 are completely closed blocking all illumination to film 17 and photocell 33. Therefore, when camera operation is initiated by actuation of switch 49, photocell 33 is not being illuminated and, as explained above, the output of the first Darlington pair of amplifier 45 is at its minimum, causing the voltage at the collector of transistor 54 to assume its maximum value. This results in the maximum output of the second Darlington stage, delivering maximum current to coil 41. This initial surge of current through coil 41 causes coil 41 to move to the left and vanes 19 and 21 uncover the photocell and open the camera aperture. As soon as the vanes have opened sufficiently to permit the illumination impinging upon photocell 33 to near the predetermined operational intensity, transistors 53 and 54 of the first Darlington stage quickly increase their output, causing an increased voltage drop over resistor 57 and thereby decreasing the control voltage at the base of transistor 55. This results in a sharp reduction in the output of the second Darlington stage, cutting down the current energizing coil 41 and thereby retarding its vane-opening movement.

It is assumed, by way of example, that a current of 20 milliamps running through coil 41 will cause its magnetic field to interact with that of permanent magnet 51 such that the motive force inducing movement of coil 41 is equivalent to the closing bias of spring 37. In a very short time following initiation of camera operation (in approximately $\frac{1}{50}$ of a second) vanes 19 and 21 stabilize at the position in which photocell 33 receives illumination sufficient to cause an output of 20 ma. from amplifier 45. If scene illumination increases, the output of amplifier 45 drops off rapidly, reducing the current passing through coil 41 and permitting the vanes to move in a closing direction under the bias of spring 37. The vanes close until the illumination on photocell 33 is again at the predetermined operational intensity and the output of amplifier 45 once again stabilizes at the 20 ma. level with the motive force induced in coil 41 balancing the closing bias of spring 37. Similarly, any decrease in the level of scene illumination causes an increase in the output of amplifier 45 and results in the further opening of the aperture formed by vanes 19 and 21 until the illumination of photocell 33 reaches the operational intensity and the coil force once again balances the bias of spring 37.

Attention is called to the fact that the unique arrangement of the parts just described, namely, the suspension of coil 41 from vanes 19 and 21 and the use of permanent magnet 51, eliminates the need for delicate galvanometer mechanisms while providing a sensitive exposure control system having a substantially linear response of vane movement to scene illumination. It is believed that the superior response of the subject mechanism over other relatively rugged devices in which a solenoid armature is used to control vane movement is attributable in part to using the coil itself as the moving member and replacing the armature with a permanent magnet, thereby eliminating dependence on magnetic induction and providing a substantial reduction in nonlinear hysteresis effects.

Further, it should be noted that problems arising from stray electric effects, which severely limit the capabilities of transistor amplifiers when used in conjunction with such sensitive elements as the photocells which monitor scene illumination in automatic exposure control units, have been virtually eliminated by the design characteristics of the amplifier herein, namely, by the extremely steep response curve of the amplifier. Since all stray electrical effects must necessarily cause changes between the virtual zero output of the amplifier and its maximum output, and since the response of the amplifier varies from zero to maximum within approximately one-third of an exposure value on either side of the desired operational intensity of illumination, any change in aperture response resulting from such stray electrical effects will only cause variations in photographic exposure falling within the "acceptable" latitude.

Attention is also called to another feature of the apparatus just described above, namely, the fact that the camera aperture is normally closed in its rest position. Therefore, the subject automatic exposure control system avoids the "bright spots" which result at the beginning and end of each sequence photographed with prior art systems in which the automatically controlled camera aperture is wide open in its rest position. However, it should be noted that the exposure control system just defined above could be revised to operate in the more conventional manner with exposure aperture controlling vanes 19 and 21 normally biased by spring 37 to their fully open position and the energization of coil 41 causing the vanes to move toward their closed position. Similarly, coil 41 could be attached to a single vane cooperating with a pair of fixed apertures to regulate exposure of film 17 and photocell 33, or such a single vane could provide only one variable aperture and photocell 33 could be illuminated by means of a beam-splitter operated behind this variable aperture. Also, other variations of the basic invention are possible, such as, amplifier 45 could be designed so that its output varies directly with the amount of illumination of photocell 33, and secondary masking means 69 could consist of a series of neutral density wedges.

In referring to the two further embodiments of the invention herein illustrated in FIGS. 4 and 5, the reference numerals applied to these figures shall have the same tens-digit suffix as that applied to similar parts in the preferred embodiment of the invention illustrated in FIG. 1.

Referring now to the embodiment of the invention herein illustrated in FIG. 4, notches 127 and 129 formed in single vane 119 and fixed mask 120, respectively, provide a variable camera aperture, while notch 131 in vane 121 provides a variable mask for photocell 133. Each of the vanes is suitably mounted upon springs 123 and 124, respectively, which serve to normally bias vanes 119 and 121 to the position illustrated. Coil 141 is supported by vanes 119 and 121, being attached thereto by means of pins 143 and 144. The movement of coil 141 through the magnetic field of permanent magnet 51 (not shown in this figure), causes vanes 119 and 131 to move against the bias of springs 123 and 124 to vary the exposure of both the film and photocell 133. The advantage of this embodiment lies in the additional ruggedness and durability provided by the substitution of spring mountings for the normal bearing points.

Another embodiment of the invention is illustrated in FIG. 5 in which vane elements 219 and 221 are mounted for movement about respective pivot points 223 and 225. Notches 227 and 229, formed in vane elements 219 and 221, provide a variable camera aperture, while the opposite end of vane 221 has notch 231 which provides a variable aperture masking photocell 233. Spring 237 is positioned to bias the vanes to a closed position. Coil 241 is supported entirely by one end of vane 219, and any motion of vane 219 is translated to vane 221 by means of the contact between radial faces 219' and 231'. Permanent magnet 251 and its pole pieces 251a and 251b provide the magnetic field in which coil 241 moves. Energization of coil 241 causes it to move to the right until the illumination of photocell 233 reaches the predetermined operational intensity, causing the motive force of coil 241 to balance the closing bias of spring 237. However, as different from the embodiment disclosed in FIG. 1 coil 241 moves axially, while coil 41 moves in a direction perpendicular to its axis.

One of the features of this embodiment reside in the damping of the vane mechanism to prevent undesirable oscillations due to sudden changes in the intensity of incident light. Vane 219 is mounted at point 223 on the end of keyed shaft 270 which rides in journal 272. Rigidly attached to the end of shaft 270 is a damping vane 274 that is sealed in hydraulic cylinder 276. This damping mechanism operates to stabilize the exposure control vane mechanism, any sudden changes in the position of vane 219 being opposed by the interaction of damping vane 274 with the fluid encased in hydraulic cylinder 276.

It should be understood that the various embodiments of the present invention described above have been selected to facilitate the disclosure of the invention rather than to limit the number of forms which it may assume, and, therefore, various modifications and alterations may be applied to the specific forms shown to adapt the invention to the requirements of practice without in any manner departing from the spirit or scope of the invention as described.

What is claimed is:

1. In a camera having a picture-taking aperture and a photoresponsive element illuminatable by scene light, an exposure regulating means comprising: masking means normally biased to a first position and movable through a range of positions for varying the amount of light entering said picture-taking aperture and for varying the illumination of said photoresponsive element; a coil wound about an axis in a relatively flat manner in which the inside diameter of the coil is much larger than its axial dimension, said coil being supported only by said masking means and movable therewith; amplifying means responsive to said photoresponsive element for energizing said coil as a function of the illumination of said photoresponsive element; and magnet means mounted adjacent said coil and oriented so that its magnetic field induces said coil to move perpendicularly to its axis whenever said coil is energized by said amplifying means; said coil being so moved whenever its energization is sufficient to overcome the bias applied to said masking means to position said masking means as a function of the intensity of said scene light.

2. A camera according to claim 1 and including adjustable secondary masking means for regulating the exposure of said photoresponsive element as a function of an exposure-determining variable.

3. A camera according to claim 1 wherein said masking means includes at least one masking element mounted on a spring member which supports said element and biases said element to said first position.

4. A camera according to claim 1 wherein said amplifying means provides maximum energization for said coil when said masking means is in said first position, said energization for said coil being diminished as a function of the increasing illumination of said photoresponsive means.

5. A camera according to claim 4 wherein said masking means completely blocks said picture-taking aperture and the illumination of said photoresponsive element when in said first position.

6. A camera according to claim 1 including damping means wherein the movement of said masking means is retarded by said damping means.

7. A camera according to claim 1 wherein, at a predeteermined intensity of illumination of said photoresponsive means, said amplifying means provides a level of energization for said coil sufficient to produce a motive force equivalent to the force biasing masking means, said level of energization increasing to its maximum and decreasing substantially to zero, respectively, whenever the illumination of said photoresponsive element varies from said predetermined intensity by a preselected factor.

8. The camera according to claim 7 wherein said preselected intensity variation factor is one-third, the level of coil energization increasing to its maximum and decreasing substantially to zero, respectively, whenever the intensity of the illumination falling on said photoresponsive element increases and decreases by one-third from said predetermined intensity.

References Cited by the Examiner
UNITED STATES PATENTS

| | | | |
|---|---|---|---|
| 3,082,674 | 3/1963 | Bagby | 95—64 |
| 3,183,808 | 5/1965 | Teshi | 95—64 |

NORTON ANSHER, *Primary Examiner.*

C. B. PRICE, *Assistant Examiner.*